United States Patent [19]

Feinstein

[11] Patent Number: 4,876,687
[45] Date of Patent: Oct. 24, 1989

[54] SHORT-PERIOD ELECTRON BEAM WIGGLER

[75] Inventor: Joseph Feinstein, Menlo Park, Calif.

[73] Assignee: Varian Associates, Inc., Palo Alto, Calif.

[21] Appl. No.: 310,477

[22] Filed: Feb. 13, 1989

Related U.S. Application Data

[63] Continuation of Ser. No. 47,078, May 5, 1987, abandoned.

[51] Int. Cl.⁴ .............................................. H01S 3/00
[52] U.S. Cl. ........................................ 372/2; 372/37; 315/4; 315/5
[58] Field of Search ...................... 372/2, 37; 315/4, 5

[56] References Cited

U.S. PATENT DOCUMENTS

| | | | |
|---|---|---|---|
| 3,717,824 | 2/1973 | Buczek et al. | 372/37 |
| 3,789,257 | 1/1974 | Friedman et al. | 315/5 |
| 4,298,824 | 11/1981 | Walsh | 315/4 |
| 4,494,039 | 1/1985 | Kim | 315/4 |
| 4,705,988 | 11/1987 | Tran et al. | 315/4 |

Primary Examiner—William L. Sikes
Assistant Examiner—B. R. R. Holloway
Attorney, Agent, or Firm—Stanley Z. Cole; Gerald M. Fisher; Kenneth L. Warsh

[57] ABSTRACT

A free-electron laser has a wiggler for a linear electron beam comprising two sets of magnetic polepieces 26, 28 periodically spaced along opposite sides of the beam. The polepieces of one set 28 are displaced along the beam from the other set 26 by one-half period. A uniform longitudinal magnetomotive force generates fields between polepieces having transverse components 22 alternating between the sets 26, 28, providing a very short periodicity and hence, high frequency wave radiation.

35 Claims, 2 Drawing Sheets

SHORT-PERIOD ELECTRON BEAM WIGGLER

This application is a continuation, of application Ser. No. 047,078, filed May 5, 1987, now abandoned.

FIELD OF THE INVENTION

The invention pertains to free-electron lasers in which electrons in a linear beam are periodically accelerated ("wiggled") perpendicular to the beam motion by periodic transverse magnetic fields. They radiate electromagnetic waves which are amplified and made coherent by reflections in a resonator such as the space between reflecting mirrors. To get high frequencies such as infrared, the beam velocity must be in the megavolt, relativistic range and the periodicity of the field must be very small.

PRIOR ART

Periodically reversing magnetic fields have traditionally been generated by a stack of permanent magnets of alternating polarity. As the period gets shorter, the magnetomotive force is reduced, leakage flux increases and soon imposes a lower limit to the available periodicity when generating fields across gaps of separation usable to transmit the electron beam.

SUMMARY OF THE INVENTION

An object of the invention is to provide a magnetic beam wiggler of very short period.

A further object is to provide a wiggler of minimum size, weight, and power consumption.

These objects are realized by forming the periodic magnet elements as opposed rows of floating ferromagnetic polepieces. Poles in opposite rows are staggered in the beam direction by one-half period. A uniform, extended, exciting magnetomotive force is supplied from an external source, such as a solenoid coil. The flux generated between polepieces has a strong transverse component alternating across the beam passageway between polepieces of the two rows with a period half the period of each row.

DESCRIPTION OF THE PREFERRED EMBODIMENTS

Figure 1:
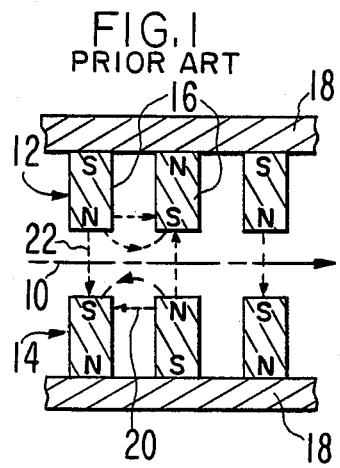
FIG. 1 is a section thru the beam direction of a periodic magnet system of the prior art.

FIG. 1 (prior art) shows a simple periodic permanent magnet (PPM) system for guiding an electron beam in a wiggling motion. The originally linear beam 10 passes between opposed rows 12, 14 of bar-shaped magnets 16 extending perpendicular to the plane of the section and to the direction of beam 10. Opposed pairs of magnets 16 are magnetized in the same direction perpendicular to the beam to produce a field 22 transverse to the beam motion. Pairs spaced successively in the beam direction have alternating polarity so the beam experiences an oscillating acceleration perpendicular to the paper. Thus, electromagnetic waves are radiated, polarized perpendicular to the paper. Their internal generating frequency is the forward velocity of the beam divided by the magnet periodiocity. At relativistic velocity an electron is almost in synchronism with its "own" wave, which is radiated mostly in the forward direction. The wave frequency received by a motionless observer is doppler-shifted to a very high value, such as infrared. Ferromagnetic bars 18 join the magnets of each row 12, 14 to provide low reluctance flux return paths. It is seen that as the magnet period is reduced, the shunt leakage flux 20 between axially adjacent magnets becomes large compared to the useful transverse flux 22, limiting the practical lower value of the magnet period, and hence, the frequency generated. The high leakage flux requires a large mass of magnetic material. Of current interest are lasers for spacecraft where size and weight must be kept very small.

Figure 2:
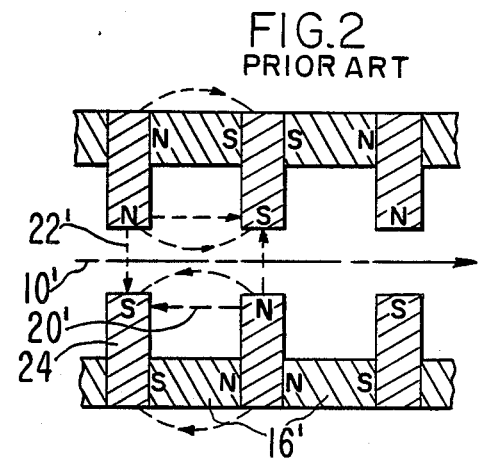
FIG. 2 is a section similar to FIG. 1 of an alternative prior-art magnet system.

FIG. 2 is another old scheme analogous to that used in traveling-wave tubes in which the magnets 16' are magnetized in the beam direction and are separated by ferromagnetic polepieces 24. Leakage flux 20' may be reduced somewhat, but the magnetomotive force available decreases with the period. No ferromagnetic flux return is used because the fields fall off rapidly away from the magnetic stack.

Figure 3:
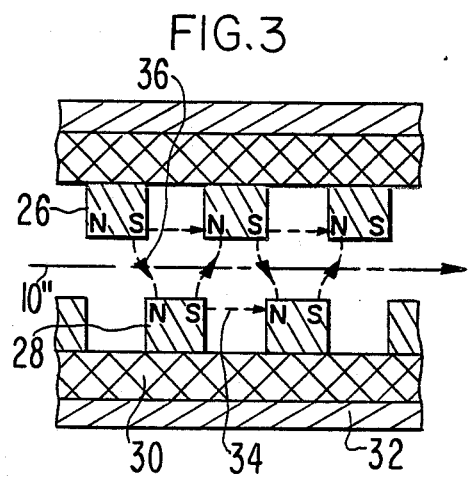
FIG. 3 is a section of a magnet system embodying the invention.

FIG. 3 is an axial section through a magnet assembly embodying the invention. It does not use short permanent magnets which would otherwise impose a limit on magnetomotive force. A first row of ferromagnetic polepieces 26 are extended perpendicular to the paper as bars, forming a linear array periodically spaced in the direction of beam 10". A second row 28 forms an opposed similar array on the opposite side of beam 10. Polepieces 28 are displaced from polepieces 26 by a half-period in the beam direction. A unidirectional magnetomotive force is applied in the beam direction, as by a solenoid electromagnet coil 30. It is surrounded by a ferromagnetic sheath 32 forming a flux return path to reduce leakage field in the environment and provide a uniform field. In the interaction space the axial field component 34 serves to keep the beam focused but does not affect the electrons' wiggler periodicity produced by the transverse field components 36 alternating between poles of opposed arrays 26, 28. The useful field strength is limited only by saturation of the ferromagnetic polepieces 26, 28, not by any permanent magnet material. The net result is a structure of small size, light weight and easy manufacture which provides short periodicity unmatched by the prior art.

Figure 4:
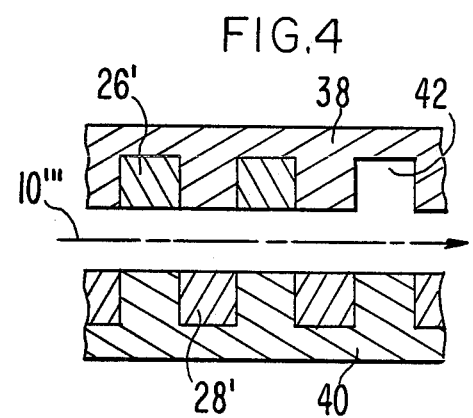
FIG. 4 is a sketch of magnetic elements of a free-electron laser embodying the invention.

FIG. 4 is a sketch of the magnetic components of a beam wiggler embodying the invention.

For ease of manufacture and perfection of alignment and spacing, the ferromagnetic polepieces 26, 28 are supported and spaced by interleaving pieces of non-magnetic material. FIG. 4 illustrates the magnetic part of a practical structure. Polepieces 26', 28' are inserted in grooves 41 between teeth 42 in parallel comb-shaped, non-magnetic support bars 38, 40 as of copper, which preferably form part of the vacuum envelope of the tube. Slots 42 can be made by mechanical or electric-discharge machining, thus providing accurate alignment and the uniform periodic spacing needed for a synchronous structure, as well as mechanical support and thermal cooling.

An alternative construction is a stack of separate ferromagnetic polepieces, as of iron, and interleaved separate nonmagnetic spacers, as of copper, the stacked parts being brazed together.

Figure 5:
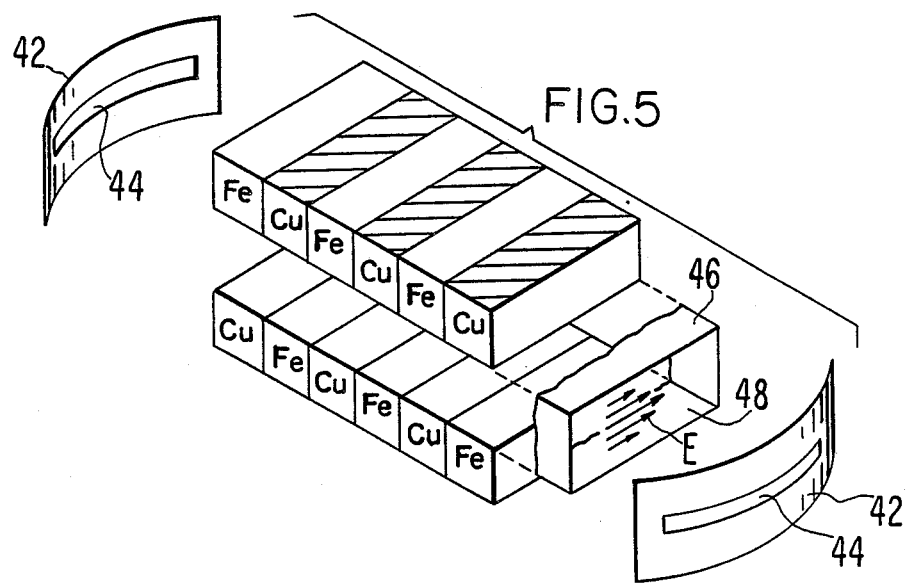
FIG. 5 is a schematic partial section of the magnetic and optical structure of a free-electron laser embodying the invention.

FIG. 5 is a partial-section isometric sketch of a free-electron laser with magnetic structure as shown by Section 5—5 of FIG. 4. Optional focusing mirrors 43 make the interaction space a part of a confocal, interferometer-type resonator. Mirrors 43 have central apertures 44 for passage of the electron beam. Alternatively, the undulator structure may be closed at its sides to form a waveguide 46 carrying a transverse electric field wave 48 polarized perpendicular to the partial-section plane of the paper. The mirrors 42 partially reflect this wave 48, providing electromagnetic feedback which makes the electron motions, and the radiation, coherent. Alternatively, an amplifier configuration is possible, dispensing with the on-line mirrors, but providing feedback via an external path, such as a waveguide or series of external reflectors.

Figure 6:
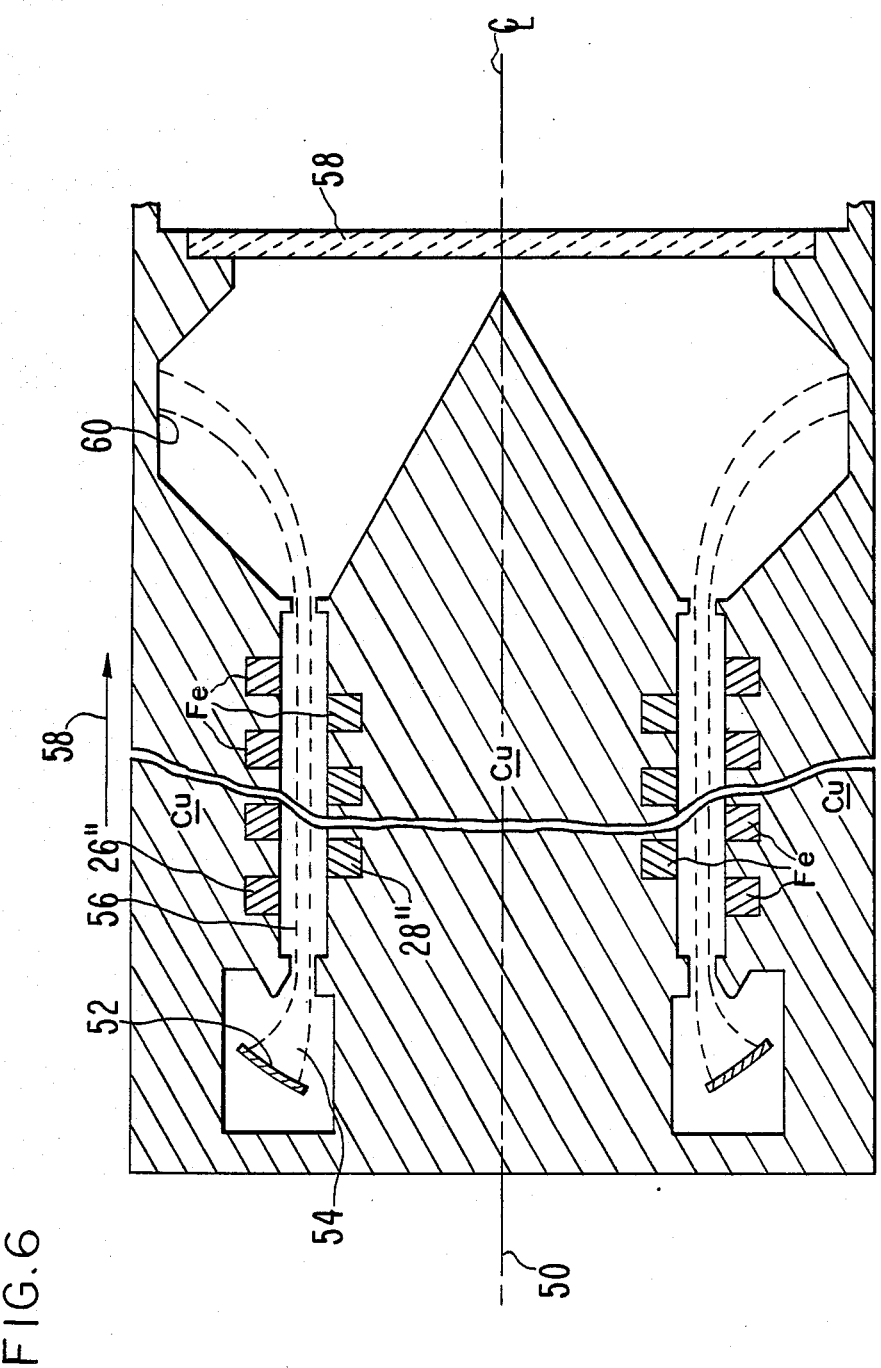
FIG. 6 is a schematic section of an alternative laser construction.

FIG. 6 illustrates an alternative laser construction having a coaxial geometry. All elements shown in cross-section are FIGURES of revolution about an axis 50. The cathode emissive surface 52 is a zone of a toroid. The electron beam 54 converges from cathode 52 to a hollow, cylindrical, linear beam 56 which flows through a hollow cylindrical passageway 57 between periodic stacks of ring-shaped ferromagnetic polepieces 26'', 28''. Beam 56 is kept focused by the axial d.c. magnetic field 59 from a solenoid magnet as shown by magnet 30 of FIG. 3. The interaction is exactly the same as in the rectangular array of FIG. 5 except that the generated electromagnetic wave has a circular-electric-mode symmetry. After passing between the magnet stacks 26'', 28'' the wave is radiated axially out through a dielectric vacuum window 58. The magnetic field 58 is reduced sharply past the polepiece stacks 26'', 28'' so that electron beam 50 expands and is collected on the enlarged surface 60 of a portion of the vacuum envelope where the power density is reduced. The output section geometry is thus somewhat similar to the familiar circular-electricfield gyrotron. The electromagnetic interaction is of course much different in that the periodic electron motion is produced by the spatially periodic magnetic field whereas in the gyrotron it is a result of the cyclotron rotation in a uniform magnetic field. The frequency limit of the gyrotron is limited by the available magnetic field strength. In the present laser this limitation is not present, so much higher frequencies may be generated.

The frequency of the radiation is tunable by varying the energy (velocity) of the electron beam 10. In a typical installation, the beam would be energized by a linear electron accelerator (not shown) for which means to vary the energy are well known in the art. Like other lasers, the resonator is many wavelengths long, so the emitted frequency will be in one or more very closely spaced lines.

The above-described embodiment is exemplary and not limiting. The scope of the invention is to be limited only by the following claims and their legal equivalents.

I claim:

1. A magnetic wiggler for a linear electron beam comprising:
   a passageway for said beam, a first set of ferromagnetic polepieces periodically spaced in the direction of flow of said beam, separated by nonmagnetic spaces, and positioned on a first side of said passageway;
   a second set of ferromagnetic polepieces on the opposing side of said passageway, periodically spaced to alternate in said direction of beam flow with polepieces of said first set; and
   means for generating a relatively uniform magnetomotive force in said direction of beam flow, to generate a component of magnetic field transverse to said passageway alternating between polepieces of said two sets.

2. The wiggler of claim 1 wherein said means for generating said magnetomotive force is a solenoid electromagnet surrounding said beam and said polepieces.

3. The wiggler of claim 1 wherein said polepieces are parallel bars defined by a first and a second parallel planes containing said direction of flow, said bars extending perpendicular to said direction.

4. The wiggler of claim 3 wherein said polepieces of a set are separated by interleaved bars of non-magnetic material.

5. The wiggler of claim 4 wherein said polepieces and interleaved bars are bonded together to form a rigid, extended sheet.

6. The wiggler of claim 5 wherein said sheet forms part of a vacuum envelope surrounding said wiggler.

7. The wiggler of claim 4 wherein the bars of each of said sets are disposed in notches in a sheet of non-magnetic material extending in said direction of flow.

8. The wiggler of claim 7 wherein said sheet forms a part of the vacuum envelope surrounding said wiggler.

9. The wiggler of claim 1 wherein said passageway is a hollow cylinder with axis in said direction of flow and said polepieces are substantially complete rings coaxial with said axis.

10. The wiggler of claim 9 wherein said polepieces of each set are separated by interleaved rings of non-magnetic material.

11. The wiggler of claim 10 wherein said polepieces and said rings are bonded together to form rigid, extended cylinders.

12. The wiggler of claim 11 wherein the outer of said cylinders forms part of the vacuum envelope of said tube.

13. The wiggler of claim 9 wherein said polepieces are disposed in radial notches in non-metallic cylinders.

14. The wiggler of claim 13 wherein the outer of said cylinders forms part of the vacuum envelope of said tube.

15. A free-electron laser comprising:
    a vacuum envelope;
    means for generating a linear electron beam within said envelope;
    means for wiggling said beam transverse to its direction of propagation comprising; on each of two opposite sides of said beam a set of floating ferromagnetic polepieces spaced periodically along the direction of propagation of said beam, said polepieces of one set being displaced in said direction by one-half of said period from said polepieces of the other set, and means for sustaining a unidirectional magnetomotive force in said direction of propagation;
    means for collecting said beam;
    means spaced along said beam for guiding electromagnetic waves parallel to said direction of propagation to form an electromagnetic resonator; and means for transmitting electromagnetic energy from said vacuum envelope surrounding said beam.

16. The laser of claim 15 wherein said means for generating said magnetomotive force is a solenoid electromagnet surrounding said beam and said polepieces.

17. The laser of claim 15 wherein said polepieces are parallel bars defined by a first and a second parallel planes containing said direction of flow, said bars extending perpendicular to said direction of propagation.

18. The laser of claim 17 wherein the bars of each of said sets are disposed in notches in a bar of non-magnetic material extending in said direction of propagation.

19. The laser of claim 17 wherein said polepieces of a set are separated by interleaved bars of non-magnetic material.

20. The laser of claim 19 wherein said polepieces and interleaved bars are bonded together to form a rigid, extended sheet.

21. The laser of claim 20 wherein said sheet forms part of a vacuum envelope surrounding said wiggler.

22. The laser of claim 19 wherein the bars of each of said sets are disposed in notches in a sheet of non-magnetic material extending in said direction of flow.

23. The laser of claim 22 wherein said sheet forms part of said vacuum envelope.

24. The laser of claim 15 wherein said electron beam is a hollow cylinder with axis in said direction of propagation, and said polepieces are substantially complete rings coaxial with said axis.

25. The laser of claim 15 wherein said polepieces in each of said sets are separated by interleaving rings of non-magnetic material.

26. The laser of claim 25 wherein said polepieces and said non-magnetic rings of a set are bonded to form an extended cylinder.

27. The laser of claim 26 wherein said cylinder outside said beam forms part of said vacuum envelope.

28. The laser of claim 25 wherein said polepieces are disposed in radial notches in the walls of non-magnetic cylinders.

29. The laser of claim 26 wherein the outer of said cylinders forms part of said vacuum envelope.

30. A magnetic wiggler for a linear electron beam comprising:
a passageway for said beam, a first set of ferromagnetic polepieces periodically spaced in the direction of flow of said beam, separated by non-magnetic spaces, and positioned on a first side of said passageway;
a second set of ferromagnetic polepieces on the opposing side of said passageway, periodically spaced to alternate in said direction of beam flow between polepieces of said first set; and
means for generating a relatively uniform magnetomotive force in said direction of beam flow, to generate a component of magnetic field transverse to said passageway alternating across said passageway between induced magnetic poles of said two sets such that the alternating period is half said periodic spacing.

31. A free electron laser comprising:
means for generating a beam of electrons at relativistic velocities along a linear path;
a first and a second set of floating ferromagnetic pole pieces, the ends of each set being equally spaced to define a period of pole piece separation; each said set being oriented in a direction parallel to said path and closely adjacent said path, said first set being positioned opposite said second set with respect to said path;
means for applying a generally uniform magnetic field acting in the direction of beam propagation to confine said electrons to said path, said field also magnetically polarizing said pole pieces by induction so that each defines a north and a south pole aligned in a direction parallel to said path;
said pole piece sets being offset with respect to each other such that a given pole of an element of one set is in generally opposed relationship to the opposite pole of an element of the other set, to establish a substantial magnetic flux transversely across said path which reverses twice over each period of pole piece separation, said electrons generating electromagnetic radiation as they are accelerated along said path as well as transversely thereto by said reversing transverse magnetic flux;
means for feeding back into said path a portion of the radiation thereby generated.

32. A free electron laser as in claim 1 in which said means for feeding back radiation includes mirrors at each end of said path to partially reflect said radiation along said path.

33. A free electron laser as in claim 1 in which said means for feeding back radiation includes a wave guide directing a portion of the generated electromagnetic radiation back into said path.

34. A compact short periodically high efficiency source of electromagnetic radiation comprising:
means for generating a beam of electrons and directing said beam along a linear path defining an axis;
a first set of floating ferromagnetic pole pieces spaced equally with respect to each other in a direction parallel to said axis to define a predetermined period of pole piece separation, said set being positioned closely adjacent to said beam;
a second set of floating ferromagnetic pole pieces spaced with the same period as said first set, but positioned on the opposite side of said axis, and axially displaced with respect to said first set by one-half said period;
means for applying a generally uniform axial magnetic field to both said pole piece sets and to the linear path of said beam to create a unidirectional magnetomotive force in the direction of propagation of said beam such that said pole pieces are magnetically polarized by induction in the axial direction by said field, and a substantial transverse magnetic flux from each pole of said polarized pole pieces crosses the linear beam path to the closest oppositely polarized pole of a pole piece on the opposite side of said axis; said transverse magnetic flux reversing across said beam path twice for every period.

35. A free electron laser with a linear beam of electrons,
a spatially periodically reversing transverse magnetic field across the beam between opposed rows of ferromagnetic bars, a generally uniform static magnetic field to focus said beam, the bars on one side of said beam being displaced in the direction of beam flow from the bars on the opposite side of said beam such that the transverse field generated by the induced magnetization of the bars creates two reversals of transverse field per periodic bar spacing,
means for supporting an electromagnetic wave between the sets of bars, and
means for extracting electromagnetic energy.

* * * * *